P. A. BRANGIER & R. LUCKENBACH.
APPARATUS FOR QUICK CYANIDING OF PRECIOUS METALS.
APPLICATION FILED SEPT. 22, 1909.
959,301.
Patented May 24, 1910.
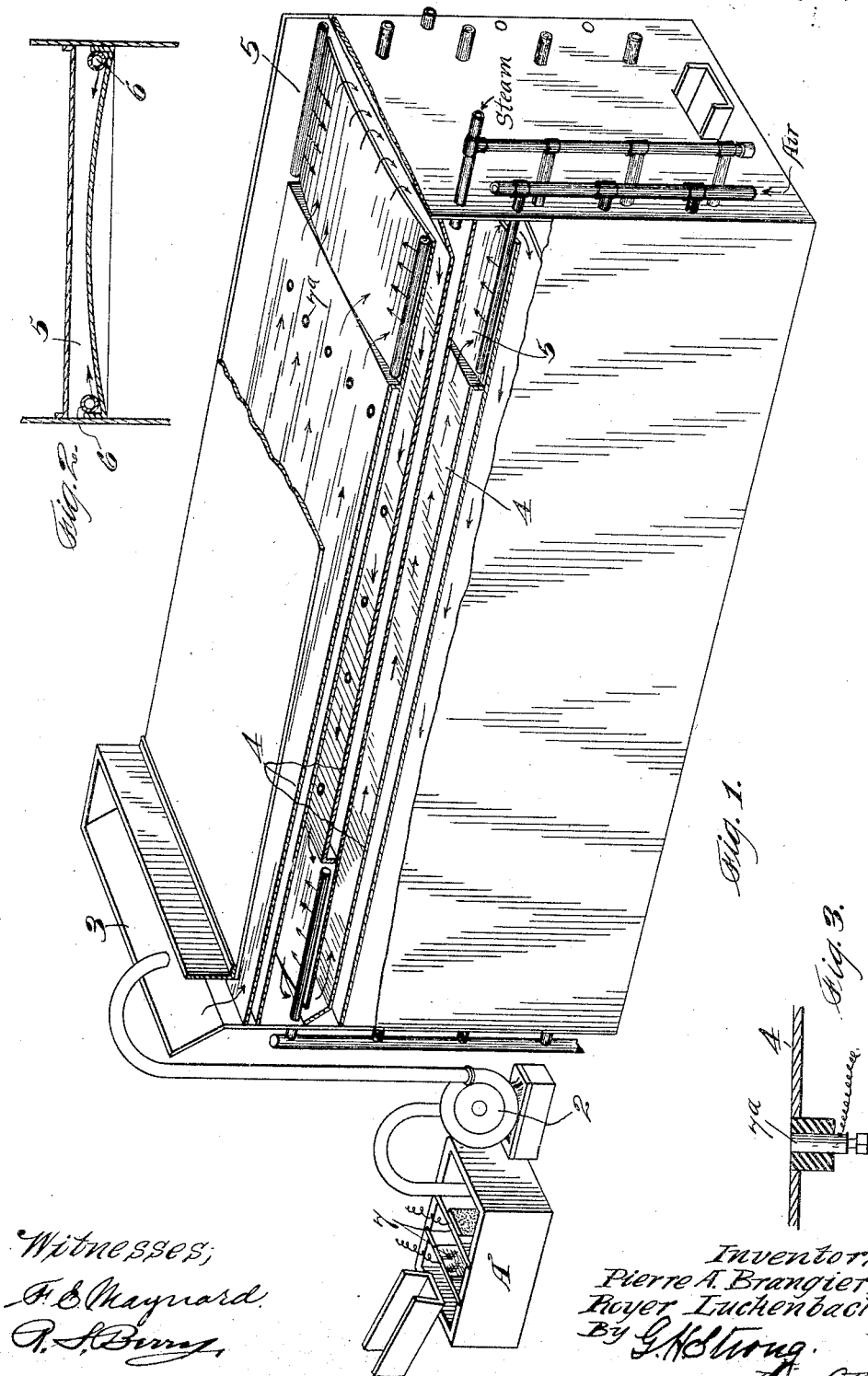
Witnesses:
F. E. Maynard
R. S. Berry
Inventors:
Pierre A. Brangier and
Royer Luckenbach.
By G. H. Strong
their Atty

UNITED STATES PATENT OFFICE.

PIERRE ARMAND BRANGIER, OF AGNEW, CALIFORNIA, AND ROYER LUCKENBACH, OF PHILADELPHIA, PENNSYLVANIA.

APPARATUS FOR QUICK CYANIDING OF PRECIOUS METALS.

959,301.          Specification of Letters Patent.      Patented May 24, 1910.

Application filed September 22, 1909. Serial No. 519,086.

*To all whom it may concern:*

Be it known that we, PIERRE ARMAND BRANGIER, of Agnew, county of Santa Clara, State of California, a citizen of France, and ROYER LUCKENBACH, of the city and county of Philadelphia, Pennsylvania, a citizen of the United States, have invented new and useful Improvements in Apparatus for Quick Cyaniding of Precious Metals, of which the following is a specification.

Our invention relates to an improvement in apparatus for the recovery of precious metals, and it is designed to provide an apparatus for the rapid dissolving of gold and silver from the complex sulfid and silicious ores with which they are associated, and which cannot be quickly treated by present methods. It is particularly adapted to the treatment of low grade ores with a high recovery of values in a single continuous operation, thus dispensing with the expensive cyanid tank methods in present use, and dissolving the values within the time required to pass by gravity through the apparatus; and effecting a radical saving in time, labor and equipment.

The invention consists in the combination of parts and in details of construction which will be more fully explained by reference to the accompanying drawings, in which—

Figure 1 is a perspective of the device in partial section. Fig. 2 is a transverse section of an air chamber, and its curved bottom plate. Fig. 3 is a detail of a plate anode.

In carrying out our invention we employ a tank A into which the ore pulverized in the oxidizing solution containing cyanid is delivered. From this tank the ore is delivered by a pump as at 2 into a hopper or receiver 3, from which it passes into the cyanid apparatus. This apparatus consists of a series of plates 4 over which the liquid is adapted to run in thin streams. These plates are disposed within a sluice-way, and as here shown they are inclined in opposite directions so that the liquid flows over one series of plates, then is returned over another beneath the first one and so on, and thus over as many series of plates as may be found desirable. These plates are heated in any suitable manner either by steam or otherwise, and at the end of each of the series of plates are located air chambers 5 into which the ore in solution is delivered at the end of each of the plates 4. The bottoms of these air chambers are made convex as shown in transverse section Fig. 2, so that the tendency of the pulp is to settle toward the sides. Compressed air pipes or passages 6 are so located as to discharge air under pressure within these air chambers and toward the center. Thus opposing currents of air act to violently agitate the pulp, causing an attrition of the particles of ore, one against the other, and a rapid scouring oxidizing effect. It also tends to break up the globules of hydrogen gas that are released during the process and which envelop the metallic atoms, thus allowing them to be more quickly acted on, and dissolved by the cyanid. The succession of these plates and air chambers is so disposed that they present a large continuous surface for alternately heating, aerating and oxidizing the ore in its passage through the apparatus, thus neutralizing the baser elements; cleansing the precious metals, and effecting a rapid solution of the same.

It is our purpose to employ electrodes within the tank A containing the oxidizing solution, as shown at 7, so that the pulverized ore will be electrolyzed before being delivered into the above described apparatus, and we thus increase the solvent action of the cyanid, and more readily overcome the refractory nature of the ore, and also to electrolyze the material within the apparatus by placing anodes $7^a$ in the plates set in a non-conducting ring, the plates being connected as cathodes.

In practice we may employ a plate surface of approximately 100 feet more or less, having ten troughs or sluices about ten feet long by three feet wide, two-thirds of the length being the hollow heated plate surfaces, and one-third the air agitating inclosed chambers. This arrangement provides a very compact form of apparatus having large operating surfaces, and the dissolving of the values is effected in a single continuous operation. The plates are set at a slight angle sufficient to permit a free movement of the pulp containing liquid by gravitation, so that a large amount of material can be handled daily. The precious metal having, in this part of the apparatus, been released from its associated gangue, and now in solution, may be delivered into any suitable apparatus by which the valuable metals may be recovered.

Having thus described our invention, what we claim and desire to secure by Letters Patent is—

1. The combination in an apparatus for lixiviating and recovering precious metals, of a sluice, a series of superposed alternating heated plates, and air chambers, and means to inject air under pressure into the passing material.

2. The combination in an apparatus for recovering precious metals, of a sluice, a series of superposed, inclined heated plates, and air chambers forming continuations of said plates through which material is caused to pass, and means to inject air under pressure into said chambers.

3. The combination in an apparatus for the recovery of precious metals, of a sluice, a series of inclined heated plates over which material is caused to flow, air chambers through which the material can flow from each of the plates, electrical connections with the plates forming cathodes, and insulated anodes set in the plates.

4. The combination in an apparatus for the recovery of precious metals, of a sluice, a series of superposed alternating oppositely inclined heated plates, air chambers forming continuations beneath each of said plates, each air chamber discharging upon the upper end of the next heated plate means to inject air under pressure into said chambers, and connections whereby a current of electricity may be passed through the apparatus.

5. The combination in an apparatus for recovering precious metals, of a sluice, a series of superposed inclined alternating heated plates, with air chambers interposed and return channels between said plates, means to inject air under pressure into the channels, electrical connections directly with the upper plates and insulated connections with the bottom plates.

6. In an apparatus for the recovery of precious metals, a sluice, inclined heated plates over which the pulp containing liquid flows by gravitation, chambers adapted to receive the pulp from the heated plates, and means for discharging compressed air into said chambers and through the pulp.

7. In an apparatus for recovering precious metals, a sluice, inclined heated plates over which the pulp flows by gravitation, chambers adapted to receive the pulp from said plates, said chambers having convex bottoms and perforated pipes along the sides through which air under pressure is discharged through the passing pulp.

8. In an apparatus for recovering precious metals, a sluice, inclined heated plates over which the pulp flows by gravitation, chambers adapted to receive the pulp from said plates, said chambers having convex bottoms, with the convexity in the line of travel of the pulp, perforated pipes located on each side at the lower edges of the plates, through which pipes air under pressure may be discharged into and through the passing pulp.

9. In an apparatus for the recovery of precious metals, a sluice, a series of oppositely inclined heated plates, convex bottomed chambers connecting with the discharge end of each plate adapted to receive the pulp from the plates, perforated air pipes located at the sides and lower angles of the chambers and means to discharge air through the passing pulp, said air chambers delivering successively upon the upper ends of the succeeding plates, insulated plugs located in the bottom plates and electrical connections therewith, and electrical connections with the opposed plates.

10. In an apparatus for the recovery of precious metals, a sluice, inclined heated plates, and air chambers located therein, a tank and means by which pulp and cyanid solution are delivered thereinto, means for electrolyzing the contents of the tank, and means by which the material is delivered from the tank upon the uppermost of the heated plates.

11. In an apparatus for the recovery of precious metals, a continuous series of heated plates, and alternating compressed air chambers over and through which the pulp may pass by gravitation, a supply tank means by which the pulp and cyanid solution are delivered thereinto, and electrical connections with the contents of the tank and with the plates within the sluice.

In testimony whereof we have hereunto set our hands in the presence of two subscribing witnesses.

PIERRE ARMAND BRANGIER.
ROYER LUCKENBACH.

Witnesses:
    GEO. H. STRONG,
    CHARLES EDELMAN.